(12) United States Patent
Sattiraju et al.

(10) Patent No.: US 12,021,705 B1
(45) Date of Patent: Jun. 25, 2024

(54) PIN AND TRACE IN NETWORK TOPOLOGIES

(71) Applicant: Cisco Technology, Inc., San Jose, CA (US)

(72) Inventors: Srinivas Siva Kanth Sattiraju, Long Grove, IL (US); Carlos Campos Torres, Miami Shores, FL (US); Paul Lucian Anghel, Iasi (RO); Cody W Capella, Nevada City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/203,330

(22) Filed: May 30, 2023

(51) Int. Cl.
    *G06F 15/173* (2006.01)
    *H04L 41/12* (2022.01)
    *H04L 41/22* (2022.01)
    *H04L 43/045* (2022.01)

(52) U.S. Cl.
    CPC .............. *H04L 41/12* (2013.01); *H04L 41/22* (2013.01); *H04L 43/045* (2013.01)

(58) Field of Classification Search
    CPC ........ H04L 41/12; H04L 41/22; H04L 43/045
    See application file for complete search history.

(56) References Cited

U.S. PATENT DOCUMENTS

| | | | |
|---|---|---|---|
| 9,781,008 B1 | 10/2017 | Notari et al. | |
| 10,778,537 B1 * | 9/2020 | Hu | ........................... H04L 41/12 |
| 2014/0289634 A1 | 9/2014 | Cannon, III et al. | |
| 2017/0052810 A1 | 2/2017 | Bingham et al. | |
| 2019/0377463 A1 * | 12/2019 | Fletcher | .................. H04L 41/22 |
| 2022/0263721 A1 | 8/2022 | Bogado et al. | |

\* cited by examiner

*Primary Examiner* — Padma Mundur
(74) *Attorney, Agent, or Firm* — Lee & Hayes, P.C.

(57) ABSTRACT

Techniques are described herein for implementing and using a network topology display system configured to display and support interaction with complex and/or multi-site datacenters. The topology display system may provide an interactive user interface, allowing users to navigate to different regions of the network node topology representing the datacenter, and displaying views representing the various sites, levels, and objects of the datacenter. While navigating the topology, a user may select a particular node in the network topology to be pinned, causing the user interface to display data representing the datacenter object corresponding to the selected node. As the user navigates the network topology, additional nodes may be selected to provide additional object data, which may be updated dynamically for a set of pinned nodes configured in different sites or regions of the topology.

20 Claims, 10 Drawing Sheets

PINNED NODES

| NODE 1 | NODE 2 |
|---|---|
| Nodes are the Same Object | |
| IP Address | IP Address |
| Obj Type | Obj Type |
| Connectivity | Connectivity |
| Usage Data | Usage Data |
| Traffic | Traffic |
| CPU | CPU |
| Memory | Memory |
| Path | Path |

308 — PINNED NODES

| NODE 1 | NODE 2 | NODE 3 |
|---|---|---|
| IP Address | IP Address | IP Address |
| Obj Type | Obj Type | Obj Type |
| Connectivity | Connectivity | Connectivity |
| Usage Data | Usage Data | Usage Data |
| Traffic | Traffic | Traffic |
| [−] Path<br>　Site<br>　├ Spine<br>　├── Spine<br>　└─── Leaf ... | [+] Path<br>... | [+] Path<br>... |

312 — PINNED NODES

| NODE 1 | NODE 2 |
|---|---|
| IP Address | IP Address |
| Obj Type | Obj Type |
| Connectivity | Connectivity |
| Usage Data | Usage Data |
| Traffic | Traffic |
| CPU | CPU |
| Memory | Memory |
| Path | Path |
| (REMOVE NODE) | (REMOVE NODE) |
| (RETURN TO NODE IN HIERARCHY) | (RETURN TO NODE IN HIERARCHY) |

PIN AND TRACE IN NETWORK TOPOLOGIES

TECHNICAL FIELD

The present disclosure relates generally to generating and displaying network topologies, and more particularly, to providing node pinning functionality within a network topology display user interface, to support analyses and comparison of objects across various regions of a network topology.

BACKGROUND

Datacenters operating in computing environments and networks may aggregate large numbers of hardware and/or software assets, within one or more on-premises networks, sites, fabrics, etc. The assets associated with a datacenter can include computing and network assets within the physical layer, as well as the various virtual layer assets such as virtual private networks (VPNs), virtual machines (VMs), virtual local area networks (VLANs), and the like. For complex datacenters, it can be technically challenging for administrators and/or other users to accurately determine the structure and operation of the datacenter, including the various constituent objects and connectivity across the various on-premises networks and/or sites of the datacenter. In such systems, administrators may construct network topology graphs, either manually or via graphing software programs, including hierarchical layers of nodes and edges to represent the network topology of the datacenter. Within such graphs, each level in the datacenter can be represented as a set of nodes, and each node may be connected with edges to other nodes in a higher or lower level of order in the topology, thus generating a hierarchical structure to represent the datacenter network topology.

When navigating network topology graphs, manually or via a graphical user interface, it can be challenging to identify, analyze, and/or compare objects within the network topology of the datacenter. In particular, for complex and/or multi-site datacenters, network topology graphs can include large numbers of interconnected nodes on various levels and across various sites, including different types of objects in different configurations (e.g., servers, routers, switches, endpoints, etc.). Such topology graphs can be disorienting and inefficient for users to navigate when attempting to perform analyses or administrative tasks on the datacenter infrastructure. For instance, in a network topology graph representing a complex datacenter, tasks such as locating nodes representing particular objects, analyzing the usage and performance of the objects, and determining corresponding or related objects in other portions of the topology graph, can be time-consuming and error-prone tasks for datacenter administrators to perform. Further, users may be required to access multiple data sources storing different object-related data for the various nodes in the network topology, including various attributes of the datacenter objects, object usage and/or network traffic data, object or site connectivity data, etc. The complexity of the datacenter network topology and the distribution of relevant data across multiple systems can result in significant delays and errors for datacenter administrators when performing tasks such as diagnosing failures and performance issues within the datacenter, analyzing, upgrading, or replacing objects in the datacenter, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 3A-3D depict various examples of a pinned nodes component of a user interface generated by a topology display system, in accordance with one or more examples described herein.

DESCRIPTION OF EXAMPLE EMBODIMENTS

Overview

Figure 1:
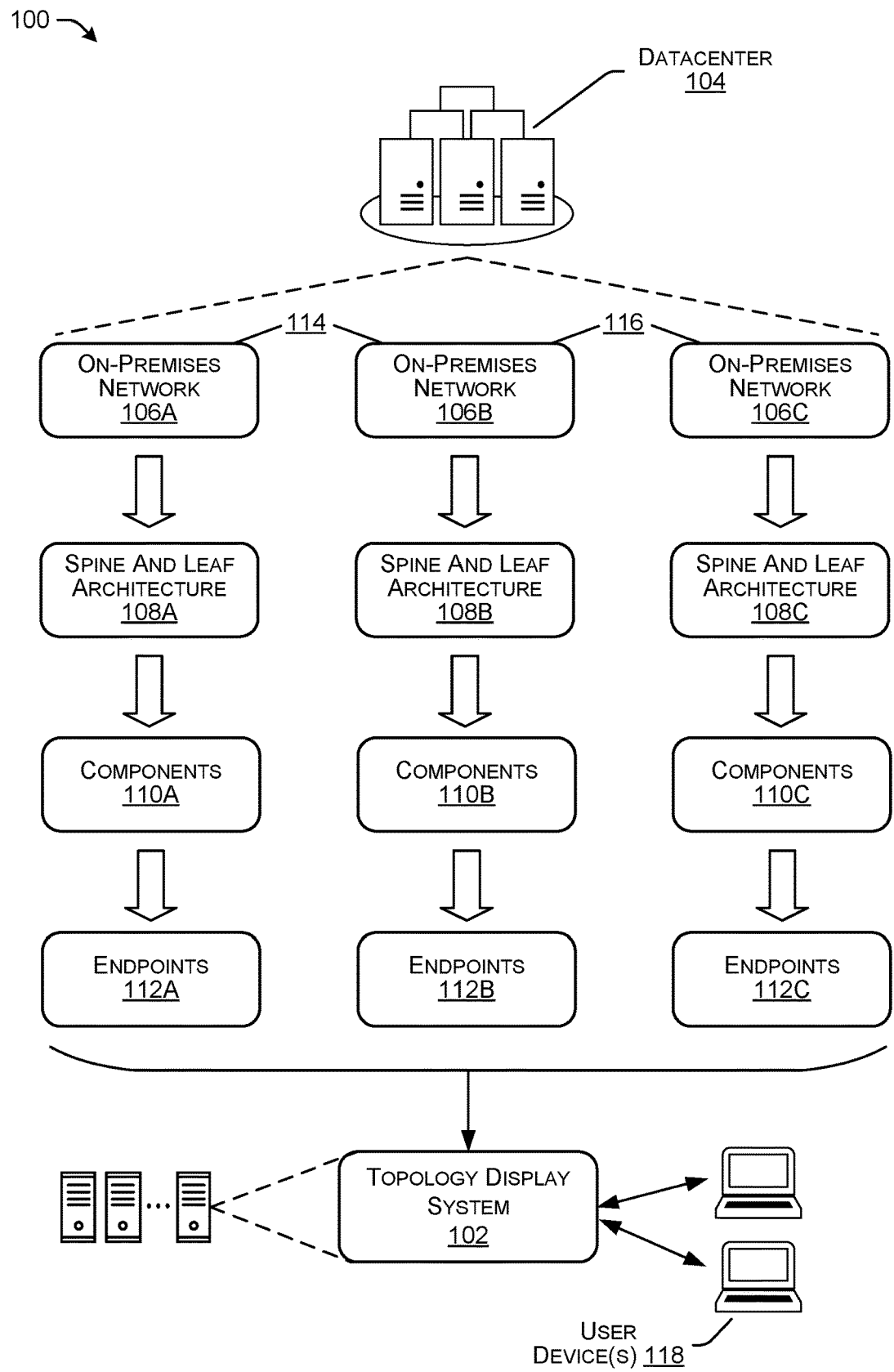
FIG. 1 illustrates an example topology display system configured to provide a user interface to view and interact with a datacenter including various component levels within multiple on-premises networks, in accordance with one or more examples described herein.

The present disclosure relates generally to implementing and using a network topology display system configured to display and support interaction with complex and/or multi-site datacenters. In some examples, the topology display system may provide a user interface and corresponding tools to display various levels of a network topology to a user, allowing the user to traverse levels of the hierarchy as well as navigate to different regions (e.g., different sites, on-premises networks, etc.). When navigating a network topology representing a datacenter, the topology display system may provide seamless transitions between levels and regions of the topology while also preserving the user's original context within the user interface to provide a more robust and coherent user experience. The topology display system may provide functionality for selecting, analyzing, and modifying (e.g., adding, removing, configuring, etc.) the various nodes in the topology, each of which may represent an individual object or group of objects in the datacenter.

As described in various examples herein, the topology display system may allow users to select particular nodes in the network topology to be pinned on the user interface. When a node is pinned, the topology display system may retrieve the corresponding object data for the object (or objects) in the datacenter that the pinned node represents, and display the object data within the user interface for analysis and comparison by the user. In some examples, the object data representing a pinned node may be displayed in a dedicated location on the user interface (e.g., a pinned nodes data container element), and may be displayed persistently so that the pinned node continues to be shown on the user interface as the user navigates to different regions of the network topology (e.g., when the pinned node is no longer displayed in the topology navigation window of the user interface).

Various types of object data may be displayed in the user interface for a pinned node, including, but not limited to, object identifiers, network addresses, connectivity data, object usage data, network traffic data, and the object path within the network topology. The topology display system may retrieve the object data from various computing systems of the datacenter and/or other data sources, such as from the object itself, data stores associated with the on-premises network of the object, network and performance monitoring systems of the datacenter, site-to-site connection data, etc. As described below in more detail, the topology display system may be configured to dynamically track and update the object data for the pinned nodes displayed in the user interface, including periodically requesting and/or receiving updated object data from the various data source. The object data for any pinned nodes, including connectivity data, usage data, network traffic, etc., also may be updated as the user navigates to different regions of the network topology, such as different levels and/or different sites when the pinned nodes are no longer visible in the portions of the network topology displayed on the user interface.

In some examples, when multiple nodes are selected and pinned by the user, the topology display system may display corresponding sets of object data (e.g., side-by-side) in the user interface to allow for immediate analysis and comparisons of the selected objects. For instance, the topology display system may detect and display indications when a pair of selected nodes correspond to the same object in the datacenter. The topology display system also may detect and display indications of when multiple pinned nodes are connected (e.g., via a secure site-to-site connection established between servers/endpoints on different networks). Additionally or alternatively, the topology display system may detect and display the path data for each pinned node (e.g., the path between the location of the node in the network topology and a root node of the site and/or datacenter), as well as identifying any overlapping portions within the paths of the multiple pinned nodes.

The topology display system, in some implementations, may be configured to support any number of pinned nodes simultaneously, including nodes representing any number of objects and/or types of objects in the datacenter. In other implementations, the topology display system may be configured to allow a maximum number of pinned nodes at any one time (e.g., a maximum of two pinned nodes), and/or may enforce restrictions about the object types (and/or combinations of object types) which can be selected by the user for pinning. Such restrictions can be based on administrative preferences of the datacenter, and/or compute or storage limitations of the topology display system. In some examples, when a node is selected for pinning, the topology display system may automatically traverse the network topology and retrieve all parent nodes associated with the pinned node. The pinned node and all associated parent nodes may be added to the pinned nodes data element on the user interface, where the parent nodes either can be displayed visibly or hidden and used for path data, connectivity data, usage and traffic data, etc.

As described in these examples and depicted in the figures, the techniques described herein may be implemented by a network topology display system associated with one or more datacenters. A datacenter may be implemented using any number of physical and/or logical computing assets, which may reside in a single on-premises network or may be distributed across multiple on-premises networks and/or cloud computing environments. Although depicted herein as a separate computing system, in some examples, the topology display system may be implemented as a set of related systems/services operating on each of the on-premises networks (and/or clouds) of the datacenter.

The techniques described herein may be implemented, for example, as methods, non-transitory computer-readable media storing computer-executable instructions, and/or systems comprising processors and non-transitory computer-readable media configured to perform various operations.

EXAMPLE EMBODIMENTS

Referring now to FIG. 1, an example computing environment 100 is shown, including a topology display system 102 configured to provide an interactive user interface to allow users to view and interact with a datacenter 104 including various component levels within various on-premises networks 106. As described below in more detail, a datacenter 104 may be represented as network topology, which can be described and/or displayed as a network graph or topology map. The network topology of the datacenter 104 may include various levels within each of multiple on-premises networks (or sites). The datacenter 104 may include any number of site-to-site connections, which can be determined by the topology display system 102 and depicted in the user interface displaying the network topology.

As described below, users may navigate and explore the network topology of the datacenter 104, by initially selecting one of the on-premises networks via the user interface provided by the topology display system 102. After selecting an on-premises network, the user interface may display the portion of the network topology residing on the on-premises network, along with user interface options to allow the user to traverse up or down in the topology, drill down on specific portions of the topology to see more detail, and/or specific nodes, etc. Additional examples and features of user interfaces to allow users to navigate a network topology of a datacenter, including traversing levels, expanding and contracting the topology, exploring nodes, etc., can be found in U.S. patent application Ser. No. 17/977,090, filed Oct. 31, 2022, and titled "Network Topology Providing a Seamless Transition Between Levels," which is incorporated herein by reference in its entirety for all purposes.

As shown in this example, one or more of the on-premises networks may use a spine and leaf architecture 108 to implement the levels of the network topology. In such architectures, network components (e.g., switches, routers, servers, endpoints, Kubernetes, etc.) may be configured in various roles as a spine or leaf. A spine at one level in the network topology may be coupled to one or more leaves in a subsequent level, and users may select spine nodes with the user interface to expand the spines into individual spines with each spine connected to the corresponding leaves. Users also may select a group of spines to collapse them back within the user interface. Similarly, users may select a leaf via the user interface, to receive options for interacting with the leaf in various ways (e.g., receiving additional leaf details, drilling down further within the network topology, marking the leaf as a favorite, etc.). Additional data displayed via the user interface relating to a leaf may include, for example, anomalies with respect to a leaf, advisory levels, a number of interfaces, connectivity information, inventory, etc. Additionally, in some examples, a user may select a control component within the user interface to display site details of on-premises networks via the user interface. Such site details may provide various information with respect to anomaly levels, advisory levels, general information, a traffic amount, a number of interfaces, and connectivity information, as well as inventory within an on-premises network (or site).

When particular components 110 are selected via the network topology user interface, the user interface may provide additional options and/or data relating to the selected components. For example, controls may be provided via the user interface to allow users to display component details, drill down further within the network topology, mark the component as a favorite, etc. The additional component details control option, when selected, may display component data such as the anomaly level health of the component, advisory levels, connectivity, general information related to the component (e.g., model number, type, reboot information, IP addresses), etc. Component data may be displayed in a page format or a table format. Similarly, when the user drills down further to select individual endpoints 112 via the user interface, various information related to the object corresponding to the selected endpoint node may be provided in a page format or table type format. The object data for an endpoint 112 may include, for example, the object status with regard to anomaly level, a device name of the object, an IP and/or MAC address associated with the object, a type of endpoint/object, an endpoint/object group, a VLAN ID, and the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example computing environment 100 including a datacenter 104 implemented using various assets from a number of on-premises networks. As shown in this example, the datacenter 104 may include includes multiple on-premises (or on-prem) networks 106A-106C (collectively referred to herein as on-premises networks 106). Although three on-premises networks are shown in this example, in other examples a datacenter may The on-premises networks 106 may be configured in a variety of ways. As shown in this example, one or more of the on-premises networks 106 may be configured with a spine and leaf architecture 108A-108C (collectively referred to herein as a spine and leaf architecture 108). Each spine and leaf architecture 108 may provide connections to various components 110A-110C (collectively referred to herein as components 110), including but not limited to servers, routers, switches, etc. Ultimate endpoints 112A-112C (collectively referred to herein as endpoints 112) (e.g., Kubernetes) within the respective on-premises networks 106 are connected to the various components 110.

As shown in this example, the topology display system 102 may receive data associated with the various architecture levels and various objects in the datacenter (e.g., on-premises networks 106, spine and leaf architectures 108, components 110, endpoints 112, etc.), as well as various site-to-site connections 114 and 116, to generate an overall network topology representing the datacenter 104. The representation of the network topology provided by the topology display system 102 may be received by and viewed on user device(s) 118 (e.g., display devices). A user (e.g., network administrator, datacenter administrator, etc.) may interact with the user interfaces (UIs) provided by the topology display system 102 to navigate within the network topology, observe the various nodes in the network topology representing objects in the datacenter 104, and perform the various functionalities described herein for pinning nodes to analyze and compare objects across different regions of the network topology.

As described herein, each node displayed in the user interface of a network topology may have an associated type, such as sites (grouped by their manufacturer), switches (e.g., spines, leaves, remote-leaves, sub-leaves, routers, access switches, etc.), servers, endpoints (e.g., physical endpoints, virtual endpoints—grouped by manufacturer, e.g., VMWare, Red Hat, Kubernetes, etc.), devices, etc. In some examples, a node displayed in the network topology user interface may represent a single object (e.g., a site, switch, server, endpoint, etc.) or may represent a group of multiple objects.

Referring now to FIGS. 2A-2D, an example diagram 200 is shown in which a user interface 202 may display a network topology representing a datacenter 104 or other complex computing systems. As shown in this example, the user interface 202 may be generated by the topology display system 102, and may be provided to user device(s) 118 to allow users (e.g., datacenter administrators) to navigate and observe the various sites, levels, and regions of the datacenter 104. In various examples, the user interface 202 may display the network topology as a network graph and/or a topology map, including individual nodes (e.g., nodes 206-234) representing the various objects (e.g., hardware, logical, and/or network assets) of the datacenter 104. In some examples, the user interface 202 may include a navigable map to allow the user to explore and traverse the network topology at each site (e.g., on-premises network) of the datacenter, and to move between the sites.

Additionally, the user interface 202 may include one or more menus for selecting a format in which the network topology may be displayed, and/or for selecting how the user may navigate between different sites and/or regions of the topology. As shown in this example, a menu may include selectable options for Inventory, IP Connectivity, and Policy and Segmentation. These options may represent different explicit views of the network topology, in which the nodes represent three points of view of a network. For instance, an Inventory option may cause the user interface 202 to display nodes representing physical objects and connections. In contrast, the IP Connectivity option may cause the user interface 202 to display nodes representing logical network segments and connections. The Policy and Segmentation option may cause the user interface to display nodes exhibiting segmentation objects and enforced policies in their respective network.

In some examples, the user may initially interact with the network topology in the user interface by selecting an on-premises network from a top-level listing of sites/on-premises networks. In this example, a first on-premises network 204 is displayed, along with a portion of the network topology provided by the on-premises network 204. By interacting with the user interface 202, the user may navigate and observe the various nodes displayed in the user interface 202, including viewing site details and/or site-to-site connections 236, traversing up or down levels within the network topology, drilling down on particular nodes of the network topology, and/or view the details of any nodes current displayed in the user interface 202. In various examples, traversing to different nodes and/or levels in the network topology, as well as selecting particular nodes within the topology to observe object details and/or pin the object, can be performed using any number of user interface interaction techniques (e.g., scroll bars, arrow keys, clicking-and-dragging operations, clicking and/or double-clicking on nodes, etc.).

As shown in this example, the network topology displayed in the user interface 202 includes multiple levels of nodes representing different objects connected in different ways within the network topology. For instance, a first level of nodes 206-210 includes spine objects (e.g., switches). A particular spine node 208 has been selected and drilled down on by the user, causing a second level of nodes 212-218 (including leaf and spine nodes) to be displayed. A particular leaf node 214 then has been selected and drilled down on by the user, causing a third level of nodes 220-234 (including components and/or endpoint nodes) to be displayed. The spine and leaf nodes depicted at the various levels in the network topology may represent, for instance, switches, servers, and routers. Other examples of nodes at different levels may include switches, endpoints (e.g., Kubernetes), etc.

In some examples, the network topology displayed via the user interface 202 may be displayed in various different manners with respect to the network components. As noted above, in some configurations, the network topology may be displayed in an inventory form, including nodes may be displayed as spines, leaves, and various components such as servers, routers, switches, endpoints, etc., and then the ultimate endpoints. In other configurations, the network topology may be displayed to the user including nodes in the form of IP connectivity, e.g., inter-site nodes, virtual routing and forwarding (VRF) nodes, subnets, and the ultimate endpoints.

Figure 2A:
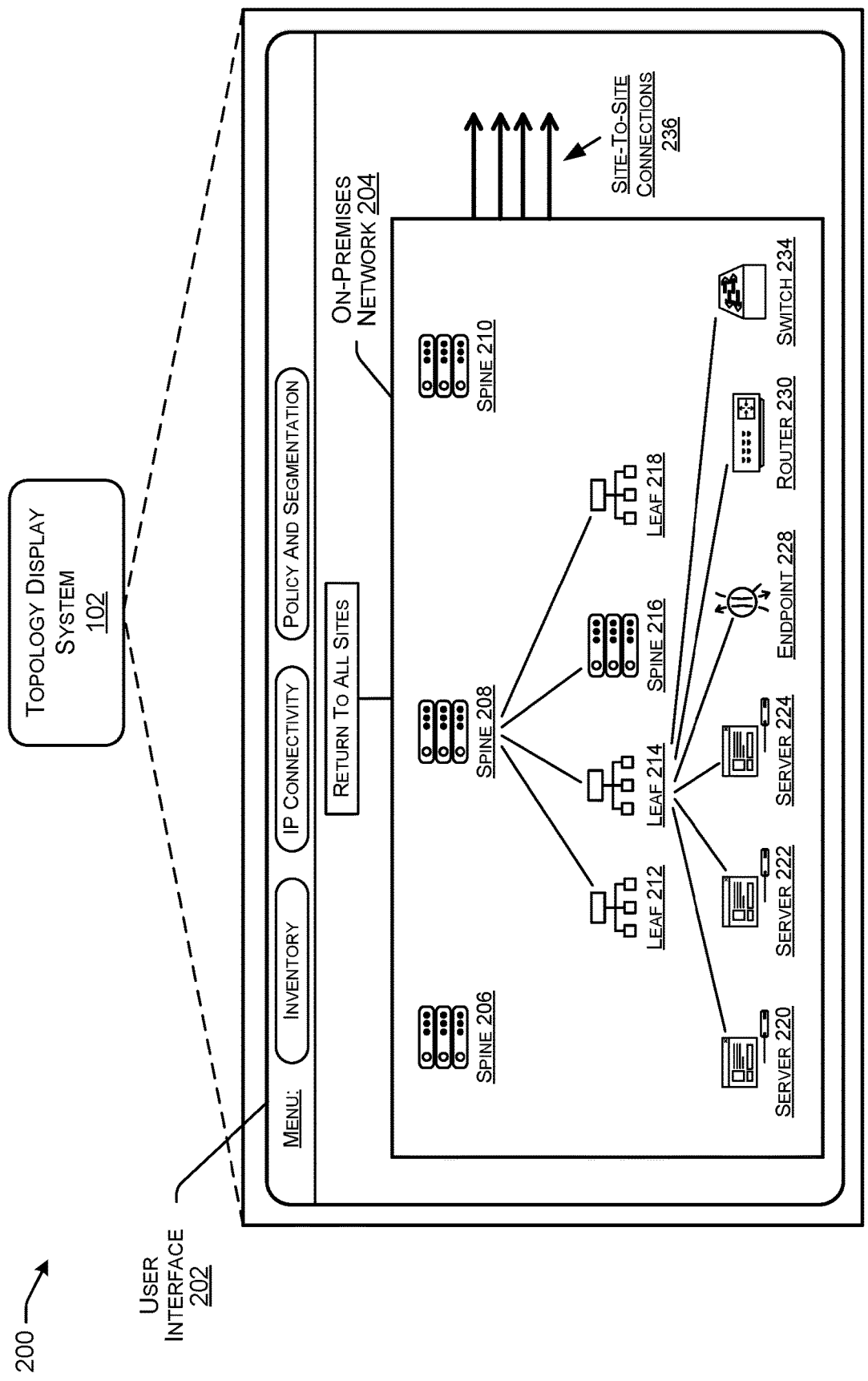
FIGS. 2A-2D depict an example user interface generated by a topology display system, configured to compare and analyze various nodes pinned by a user representing objects within a datacenter, in accordance with one or more examples described herein.
Figure 2B:
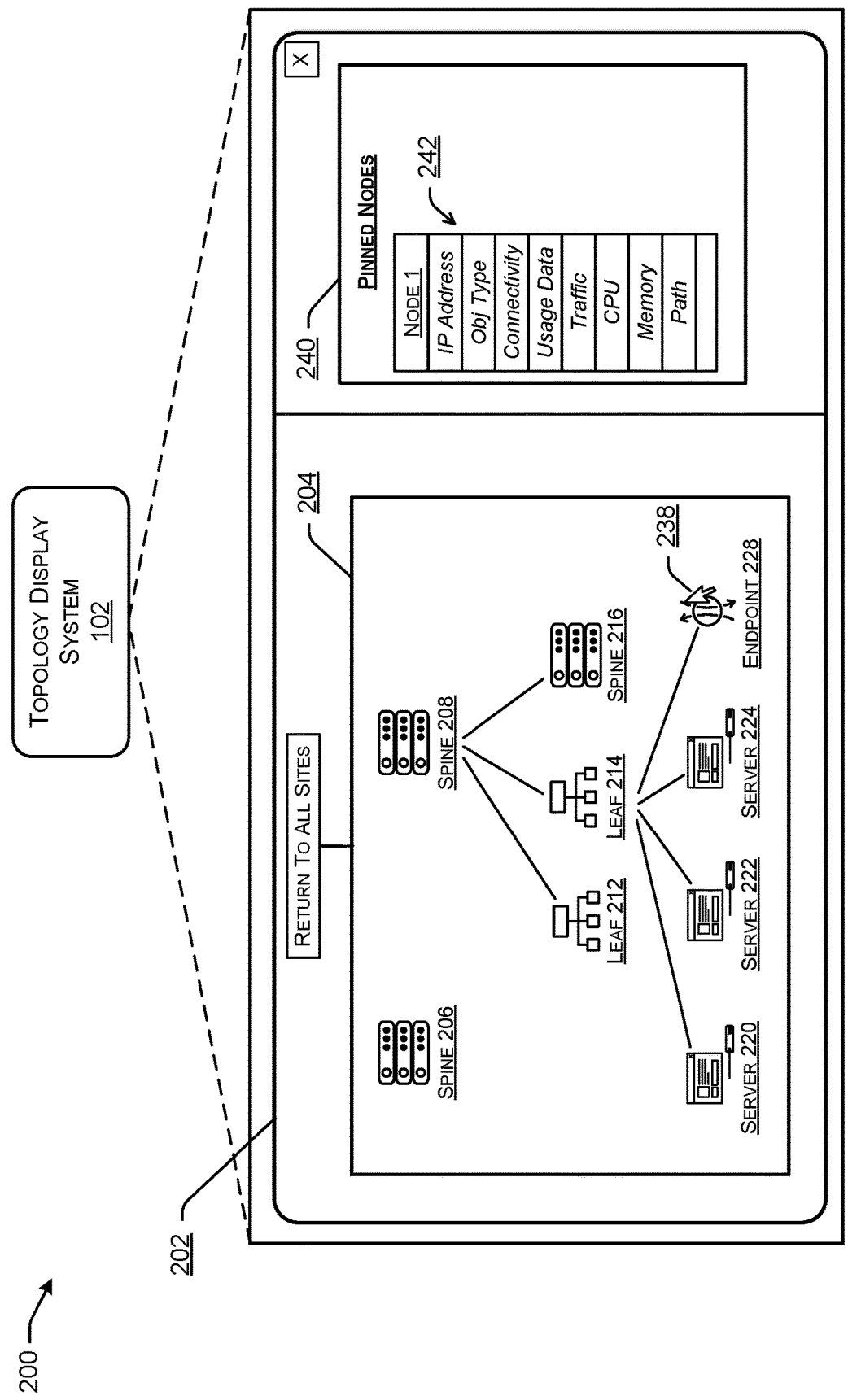

Referring now to FIG. 2B, in this example, the user has selected a particular node in the network topology to be pinned within the user interface 202. For example, the user may interact with the user interface 202 to select endpoint node 228 (e.g., using a right-click of the cursor 238 or other selection technique) to designate the endpoint node 228 for pinning within the pinned nodes element 240 of the user interface 202. As shown in this example, the pinned nodes element 240 may be implemented in particular region of the user interface 202, such as a collapsible sidebar pane that is configured to automatically expand whenever one or more nodes are currently pinned, and to hide when no nodes are currently pinned. In other examples, other techniques may be used to display the pinned nodes element 240, such as a separate user interface window (e.g., a pop-up window) that may be generated automatically whenever one or more nodes are currently pinned, etc.

In response to the selection and pinning of a node (e.g., endpoint node 228) by the user, the topology display system 102 may retrieve data from various systems and/or data sources of the datacenter 104, relating to the object corresponding to the pinned node. The topology display system 102 then may update the user interface to include an object data table 242 within the pinned nodes element 240 to represent the pinned endpoint node 228. As described above, various types of object-related data may be retrieved and displayed within the object data table 242, including (but not limited to) an object identifier, network addresses (e.g., IP and/or MAC address associated with the object), the type of object, an object group, a VLAN ID, etc. Additionally, as shown in this example, the object data table 242 also may retrieve and display data relating to the current operational status and/or usage of the pinned object within the datacenter 104, including data such as the current CPU status, memory usage status, network traffic data, connectivity, and the like. The information displayed for a pinned node may be configurable by the user via the menus of the user interface, and in some examples the information may be variable based on the object type of the selected node. In various examples, the object data table 242 may provide additional pieces of information relating to the pinned node, such as anomaly levels, advisory levels, general information, traffic amounts, numbers of interfaces, connectivity information, etc.

In some examples, when a node in the topology has been selected by the user for pinning, the topology display system 102 also may perform a backtrace function (or similar operations) to determine the path of the selected node within the datacenter 104. A path of a selected node may include the ordered listing of datacenter objects/components connecting the selected node to a root node of a site of the datacenter 104. For example, if a node representing a server in the fourth level of the network topology is selected for pinning, then the various leaf nodes, upstream spine nodes, etc., may be displayed within the object data table 242 for the selected node.

As noted above, after a node (e.g., endpoint node 228) has been selected and pinned by the user, the pinned node may be persisted on the user interface 202, so that the corresponding object data for the pinned node may continue to be displayed as the user navigates to different levels, regions, and/or sites of the network topology. Further, as discussed above, the object data for the pinned node (e.g., the data within the object data table 242) may be updated dynamically so it remains accurate and up-to-date as long as the user interface 202 remains displayed and the node remains pinned.

Figure 2C:
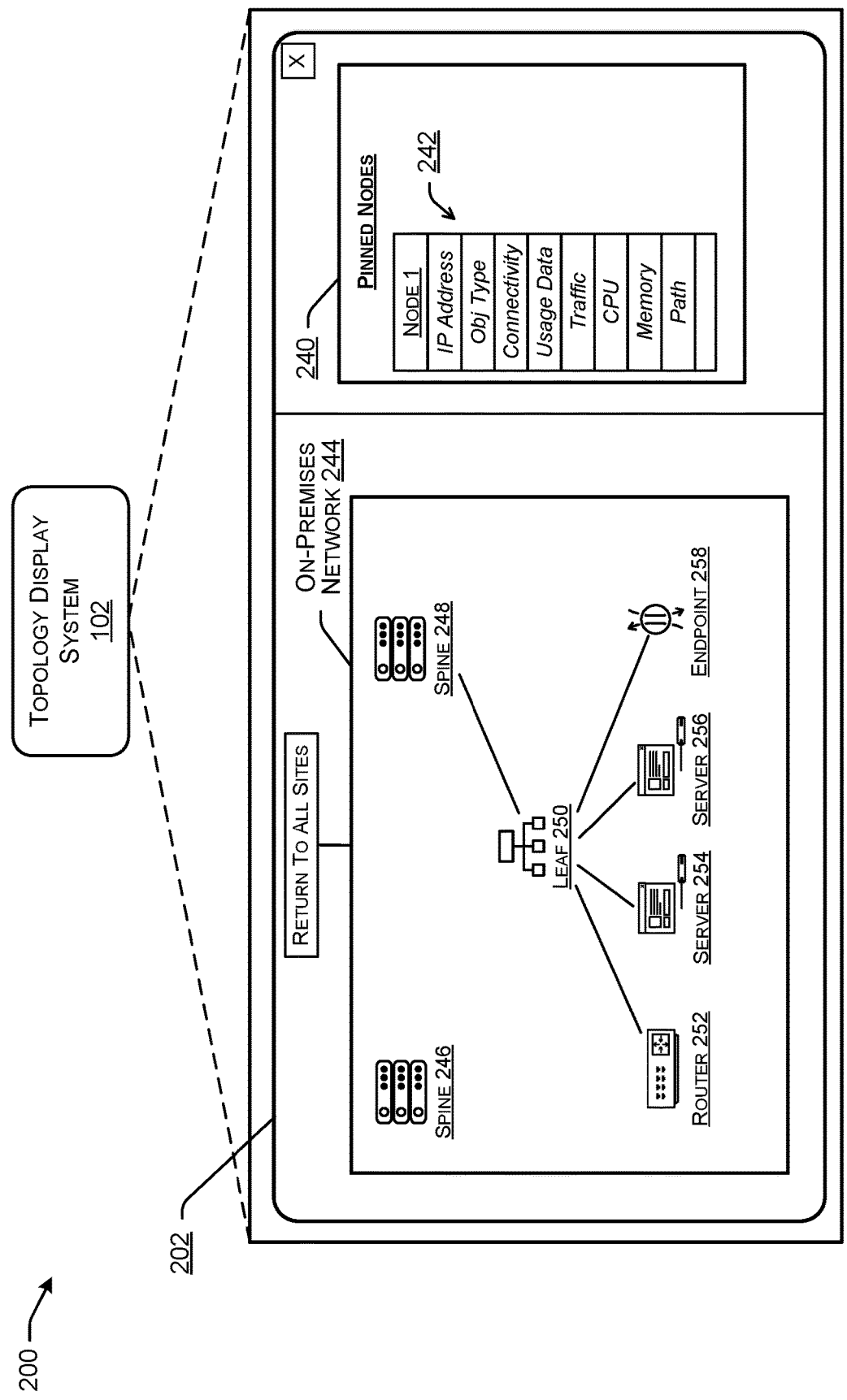

For example, referring now to FIG. 2C, the user has navigated the user interface 202 to a different region of the network topology for the datacenter 104. In this example, the user has selected a different site (e.g., on-premises network 244) and traversed the selected site to view three levels of nodes. The first level of nodes 246-248 displays two spine nodes, a second level displays a single leaf node 250, and a third level of nodes 252-258 displays component nodes and/or endpoint nodes representing objects of various types within the datacenter 104.

Figure 2D:
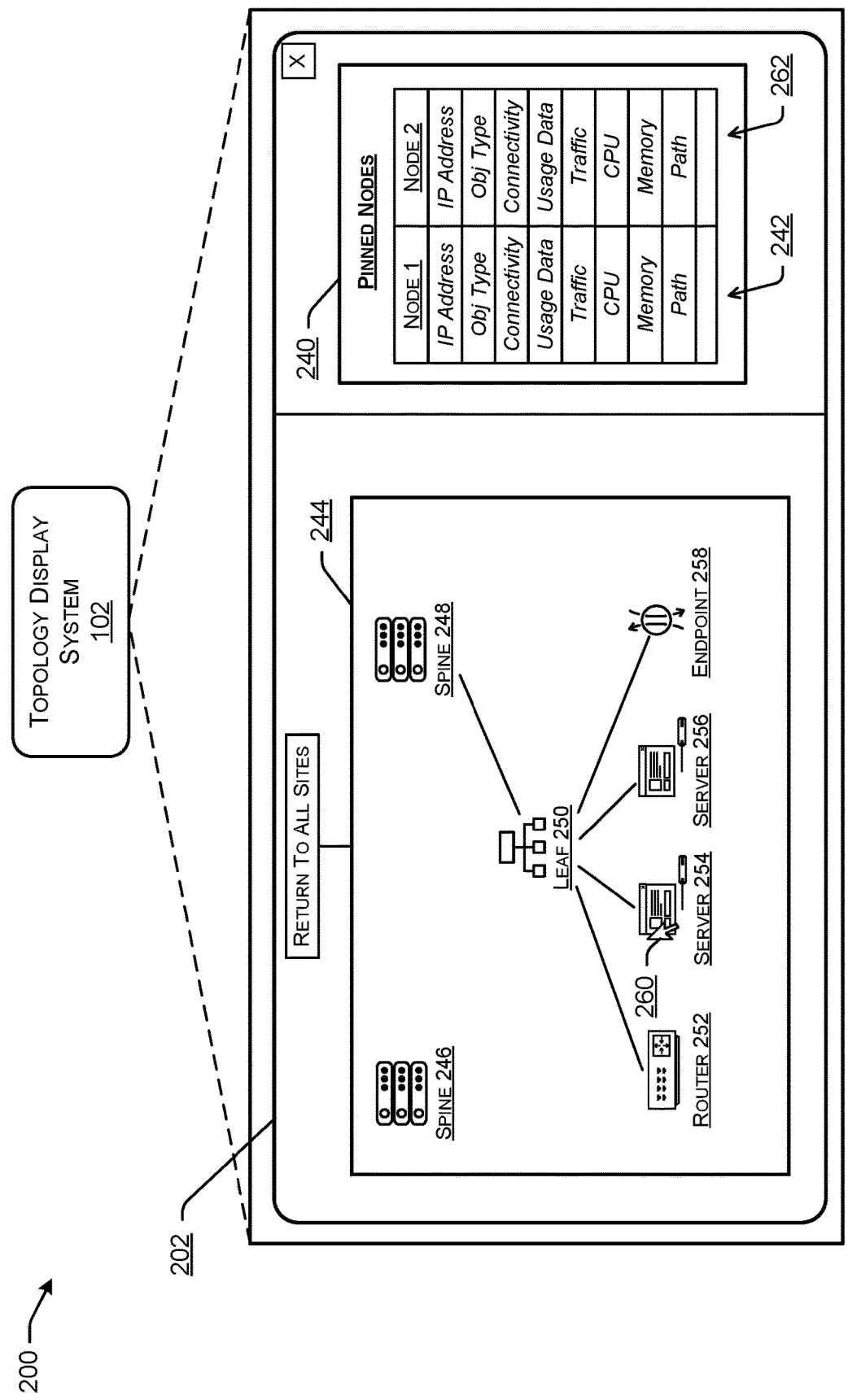

Referring now to FIG. 2D, in this example, the user has selected a second node in the network topology to be pinned within the user interface 202. For example, the user may interact with the user interface 202 to select a server node 254 (e.g., using a right-click of the cursor 260 or another selection technique) to designate the server node 254 for pinning within the pinned nodes element 240 of the user interface 202. In response to the selection and pinning of the second node (e.g., server node 254) by the user, the topology display system 102 may retrieve the corresponding object data from the various systems and/or data sources of the datacenter 104, and then may update the user interface 202 to add a new object data table 262 within the pinned nodes element 240 to represent the pinned server node 254. As described above, any or all of the various types of object-related data may be retrieved and displayed within the object data table 262 for the server node 254, such as an object identifier, network addresses, object type, object group, current operational status and/or usage data for the server node 254, network traffic data, connectivity data, path data, and the like.

As shown in this example, the object data table 262 may be displayed in the pinned nodes element 240 in alignment with the previous object data table 242 (e.g., adjacent to the left or right), to allow the corresponding object data for the pinned nodes to be readily observed and compared by the user. For example, the identifying information associated with the first pinned node (e.g., endpoint node 228) and the second pinned node (e.g., server node 254), such as object names or other identifiers, sites, network addresses, and/or object types may be displayed side-by-side to allow users to quickly discern the identity of the objects. In some instances, when the pins two different nodes that correspond to the same underlying object in the data center, the pinned nodes element 240 may provide a separate indication that the pinned objects are the same. Similarly, the alignment of the object data table 242 and object data table 262 may allow users to quickly review and compare side-by-side the object usage data, network traffic data, connectivity data, and their respective paths within the datacenter 104. For example, the connectivity data for each pinned node may include a listing of the site-to-site connections established between the pinned object and any other servers and/or endpoints on different sites within the datacenter 104. As described below, in some instances, the pinned nodes element 240 may provide a separate indication when detecting that the two (or more) pinned objects are connected.

Referring now to FIGS. 3A-3D, various examples are shown of a pinned nodes component (e.g., a pinned nodes element 240) of a user interface (e.g., user interface 202) generated by a topology display system 102 to display a set of nodes selected and pinned by a user from a network topology. As described above, a pinned nodes data element within a user interface can display various different types of data relating to the sets of nodes selected and pinned by the user while navigating the network topology. The types of object data displayed within the pinned nodes data container on the user interface may vary between implementations, and may be configurable by the user pinning the nodes, datacenter administrator, and/or may vary based on the types and/or attributes (or properties) of the nodes selected for pinning. For instance, pinned nodes from a first site in the datacenter may have different data fields displayed than pinned nodes from a second site. Additionally, pinned spine nodes may have different data fields displayed than pinned leaf nodes, pinned component nodes, pinned endpoint nodes, etc. Pinned switches may have different data fields displayed than pinned servers, pinned endpoints, and so on.

Figures 3A, 3B:

In various examples, the topology display system 102 may implement various additional features and functionalities to apply to the pinned nodes container/window displayed on the user interface. For instance, based on the information retrieved for a pair (or more) of pinned nodes, the topology display system 102 may determine that the pinned nodes correspond to the same object (e.g., same physical object, logical object, or network object) in the datacenter 104. In such examples, as shown in FIG. 3A, the topology display system 102 may display within the pinned nodes container 300 a customized indication 302 that multiple different pinned nodes correspond to the same object in the datacenter.

In other examples, based on the information retrieved for a pair (or more) of pinned nodes, the topology display system 102 may determine that a connection (e.g., a site-to-site connection) has been established between the pinned nodes in the datacenter 104. In such examples, as shown in FIG. 3B, the topology display system 102 may display within the pinned nodes container 304 a separate indication 306 that the different pinned nodes are connected.

Additionally, as shown in FIG. 3C, in some examples the pinned nodes container 308 may include expandable/collapsible path data 310 for each pinned node. In various examples, the path data 310 may be depicted as an ordered list (and/or graphically) including the nodes/objects connecting the pinned node to a root node of the site and/or datacenter. In some instances, the topology display system 102 may automatically identify any overlapping portions (e.g., common nodes/objects) within the paths of the pinned nodes, and may label or otherwise highlight the overlapping portions of the nodes paths within the pinned nodes container 308. As illustrated in this example, the topology display system 102 also may allow for pinning of three or more nodes in some cases. In such cases, the topology display system 102 may allow pinning of additional nodes up to a maximum threshold number of nodes permitted in the pinned nodes container 308.

As shown in FIG. 3D, the topology display system 102 also may provide additional features or functionality with the pinned nodes container 312 to allow users to easily remove a pinned node (e.g., remove node buttons 314) and/or to automatically navigate back to the location of a pinned node within the network topology (e.g., return to node in hierarchy buttons 316). As noted above, after a user has pinned a node within the pinned nodes container 312, the user may navigate to various other levels, regions, and/or sites of the network topology. In this example, the return to node in hierarchy buttons 316 may allow the user to quickly and easily return to the pinned node within the network topology (and/or to toggle back and forth between the locations of multiple pinned nodes in the network topology), to more easily observe, analyze, and compare the various pinned nodes.

Figure 4:
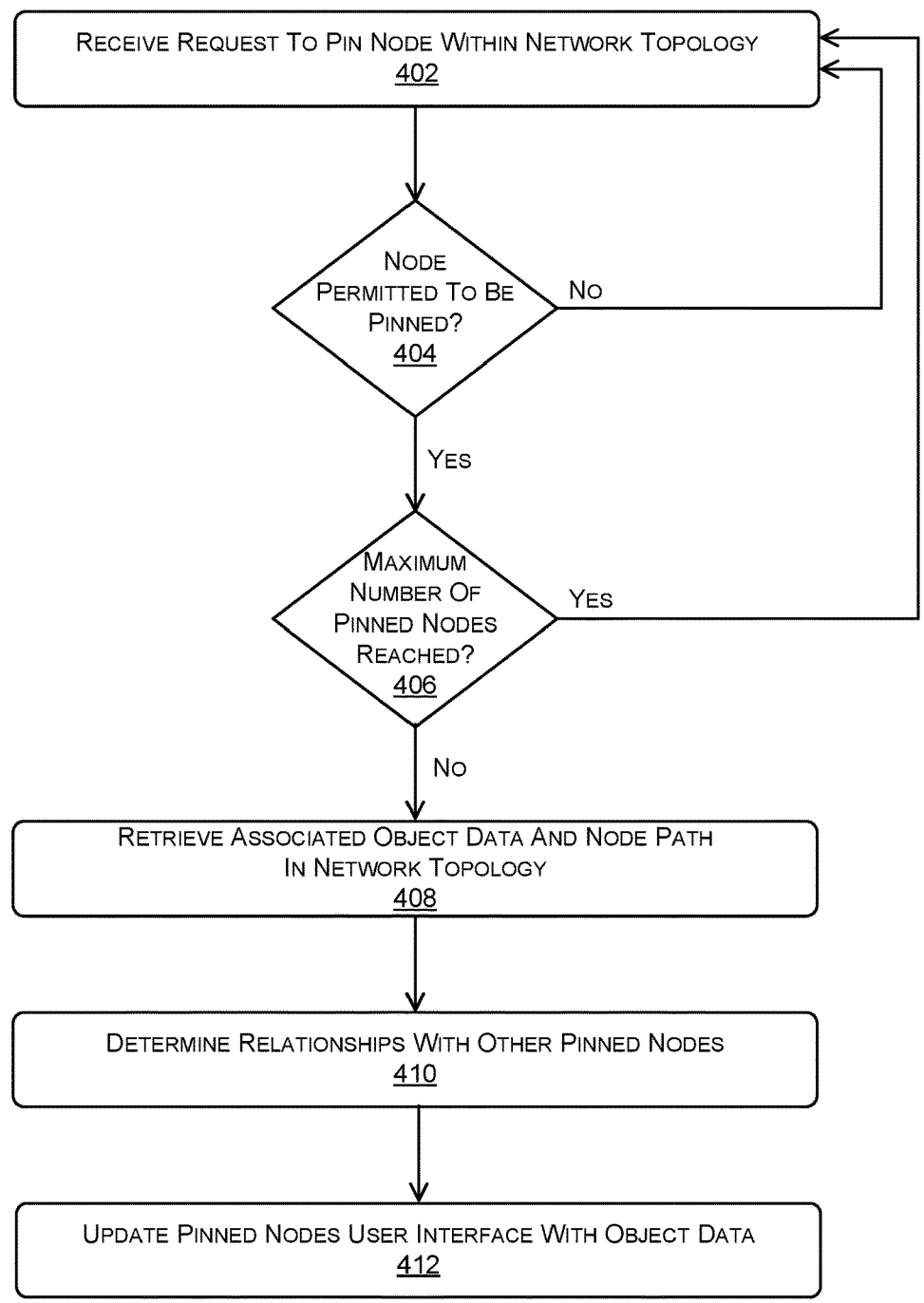
FIG. 4 is a flow diagram illustrating an example process for receiving and handling a request for pinning a node within a network topology display user interface, in accordance with one or more examples described herein.

Referring now to FIG. 4, a flow diagram is shown illustrating an example process 400 for receiving and handling requests for pinning nodes within a network topology user interface. As described below, the operations in process 400 may be performed by a topology display system 102, configured to display network topologies representing a datacenter 104 (and/or other complex computing system) within a user interface as described herein. In particular, the techniques described in process 400 may be applied by a system comprising one or more processors, and one or more non-transitory computer-readable media storing computer-executable instructions that, when executed by the one or more processors, cause the one or more processors to perform operations of process 400.

As noted above, the implementation of the various components described herein is a matter of choice dependent on the performance and other requirements of the computing system. Accordingly, the logical operations described in connection with FIG. 4 may be referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. At least a portion of these operations can also be performed by any suitable components and/or as may become apparent to one skilled in the art. Although the techniques described in this disclosure is with reference to specific components, in other examples, the techniques may be implemented by fewer components, more components, and/or different components.

At operation 402, the topology display system 102 may receive a request to pin a node within the network topology. As described above, when the user interface is displaying a network topology of object nodes representing a portion of the datacenter 104, the user interface may provide functionality to allow the user to select a particular node (e.g., by hovering over, clicking, right-clicking, etc.) and to designate that node for pinning within a pinned nodes container within the user interface.

At operation 404, after receiving a request to pin a node within the network topology, the topology display system 102 may analyze the request to determine if the node is eligible and/or permitted to be pinned on the pinned nodes container of the user interface. In some examples, any node displayed within the network topology may be selected and pinned within the pinned nodes container. However, in other examples, certain types of nodes may be ineligible for pinning. For instance, nodes within the network topology representing groups of multiple objects may be ineligible for pinning. In some cases, when the node represents a group of objects, the topology display system 102 may reject the pinning request (404:No). In other cases, the topology display system 102 may determine the number of objects represented by the node and compare the number to a maximum object threshold (e.g., 2 objects, 3 objects, etc.) to determine whether the group of objects represented by the node can all be pinned.

Additionally or alternatively, nodes representing objects of certain types may be ineligible for pinning. In some examples, the topology display system 102 may permit only certain types of nodes to be pinned (e.g., servers, components, endpoints, etc.), and other types of object nodes might not be permitted (e.g., sites, spines, leaves, etc.). Further, in some cases, the types of object nodes that are eligible for pinning may be based on the node (or nodes) previously added to the pinned nodes container. For instance, if the user has previously added a node of a particular type to the pinned nodes container, the topology display system 102 may be configured to require that additional pinned nodes have the same type. However, in other examples, the topology display system 102 be configured to allow pinning of nodes representing different types of objects.

When the node selected by the user for pinning is permitted and/or eligible to be added to the pinned nodes container (404:Yes), then in operation 406 the topology display system 102 may determine whether a maximum number of nodes is already pinned within the pinned nodes container displayed within the user interface. As noted above, in some examples the topology display system 102 may enforce a maximum number of pinned nodes (e.g., a maximum of 2 pinned nodes, a maximum of 3 pinned nodes, . . . , a maximum of 5 pinned nodes, etc.) that can be pinned at any one time within the pinned nodes container. In other examples, the topology display system 102 may have no maximum number of pinned nodes allowed.

When a maximum number of pinned nodes is enforced, the maximum number may be determined based on preferences of a datacenter administrator, or may be based on the compute and/or storage limitations of the topology display system 102. For example, as noted above, the topology display system 102 may be configured to dynamically track and update the object data for all nodes displayed in the pinned nodes container, which may include large numbers of periodic requests and/or receiving updated object data from any number of data sources associated with the pinned objects in the datacenter. As a result, a large number of pinned nodes may increase the compute and memory overhead of the topology display system 102, the network traffic within the datacenter 104, etc. In some examples, the topology display system 102 may perform on-the-fly changes in the maximum number of pinned nodes based on the current compute, memory, and/or network overhead within the datacenter 104 and/or within individual sites. Additionally or alternatively, the topology display system 102 may allow the user to change or reconfigure the maximum number of pinned nodes, but may require a corresponding change in the refresh rate of the object data for the pinned nodes (e.g., lowering the refresh rate to increase the number of pinned nodes, etc.).

When a maximum number of nodes is already pinned within the pinned nodes container (406:Yes), the pinning request may be rejected and the user may receive a notification via the user interface, indicating that one or more additional nodes must be removed before the new node can be pinned. Alternatively, when the maximum number of nodes has not been reached in the pinned nodes container (and/or when the user has removed one or more nodes as requested by the notification) (406:No), then process 400 may continue to operations 408-412 to add the requested node to the pinned nodes container.

At operation 408, the topology display system 102 may retrieve the object data for the object corresponding to the selected node, as well as the node path data within the network topology of the datacenter. As described above, the topology display system 102 may retrieve the corresponding object from any number of various data sources associated with the datacenter 104, including the object itself, data stores associated with the on-premises network of the object, network and performance monitoring systems of the datacenter, site-to-site connection data, etc. Additionally, in some examples, the topology display system 102 may automatically traverse the network topology and retrieve all parent nodes associated with the new node to be pinned. The new node and all of its associated parent nodes may be added to the pinned nodes container. As noted above, in some examples, the parent nodes to a pinned node can be displayed visibly within the pinned nodes container, or may be stored as hidden nodes which can be used and expanded within the path data.

At operation 410, the topology display system 102 may determine and analyze the relationships (if any) between the selected node and the existing nodes already pinned within the pinned nodes container. For example, the topology display system 102 may determine when a node selected for pinning by the user is the same as an existing pinned node. In such cases, the topology display system 102 may provide a notification to the user via the user interface, and/or a customized element within the pinned nodes container indicating that the multiple pinned nodes correspond to the same object in the datacenter. In other examples, the topology display system 102 may determine when a node selected for pinning by the user is connected to an existing pinned node (e.g., via a secure site-to-site connection). When a new node selected for pinning is connected to an existing pinned node, the topology display system 102 may provide a customized element within the pinned nodes container indicating the established connection between the pinned nodes. Additionally, in some cases, the topology display system 102 may determine when some or all of the path of a new node selected for pinning is the same as or overlaps with the path of an existing pinned node. When a new node selected for pinning has an overlapping path with an existing pinned node, the topology display system 102 may provide a customized path element within the pinned nodes container labeling or other identifying the overlapping portions of the path between the pinned nodes.

In operation 412, the topology display system 102 may update the pinned nodes container within the user interface, to include the object for the newly pinned node. As described above, in some examples, the topology display system 102 may align the matching data fields for the pinned nodes within the pinned nodes container, so that corresponding data (e.g., connectivity data, network traffic data, memory usage data, path data, etc.) is displayed side-by-side within the user interface, to be more easily observed and compared by the user.

As described herein, the techniques and architecture discussed in these examples provide a network topology with improved abilities to display various object nodes, and connections between nodes within complex network topologies. In particular, the techniques described herein provide improved navigation of a datacenter hierarchy, and improved object node analysis and comparison capabilities. These techniques thus allow datacenter administrators to perform various operations more efficiently and in a less error-prone manner, including upgrades, removals and replacements of components within a datacenter, etc.

Figure 5:
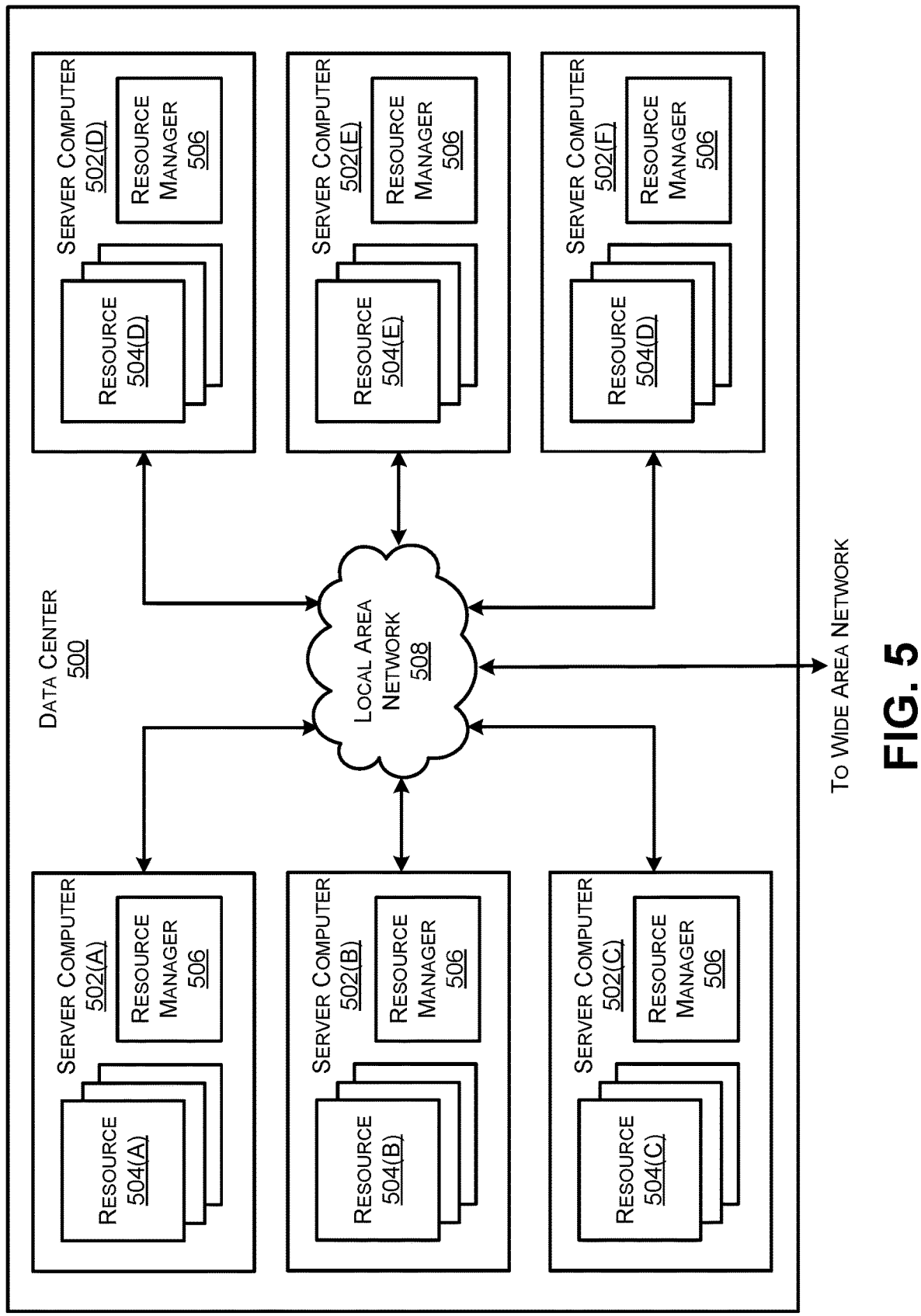
FIG. 5 illustrates a computing system diagram illustrating a configuration for a datacenter that may be utilized to implement aspects of the technologies disclosed herein.

FIG. 5 is a computing system diagram illustrating a configuration for a data center 500 that can be utilized to implement aspects of the technologies disclosed herein. As shown in this example, the data center 500 may include several server computers 502A-502F (which might be referred to herein singularly as "a server computer 502" or in the plural as "the server computers 502") for providing computing resources. In some examples, the resources and/or server computers 502 may include, or correspond to, any of the computing devices, systems, or components described herein. For example, a datacenter 104 may be implemented using one or more datacenter 500. Additionally or alternatively, a server computer 502 may correspond to any or all of the components of the topology display system 102 described herein and/or any other computing devices included in the computing environments depicted in FIGS. 1-4. Although described as server computers, the server computers 502 may comprise any type of networked device, such as servers, switches, routers, hubs, bridges, gateways, modems, repeaters, access points, etc.

The server computers 502 can be standard tower, rackmount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer server 502. Server computers 502 in the data center 500 can also be configured to provide network services and other types of services.

In the example data center 500 shown in FIG. 5, an appropriate LAN 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized. In some examples, the server computers 502 may each execute one or more application containers and/or virtual machines to perform techniques described herein.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations.

Figure 6:
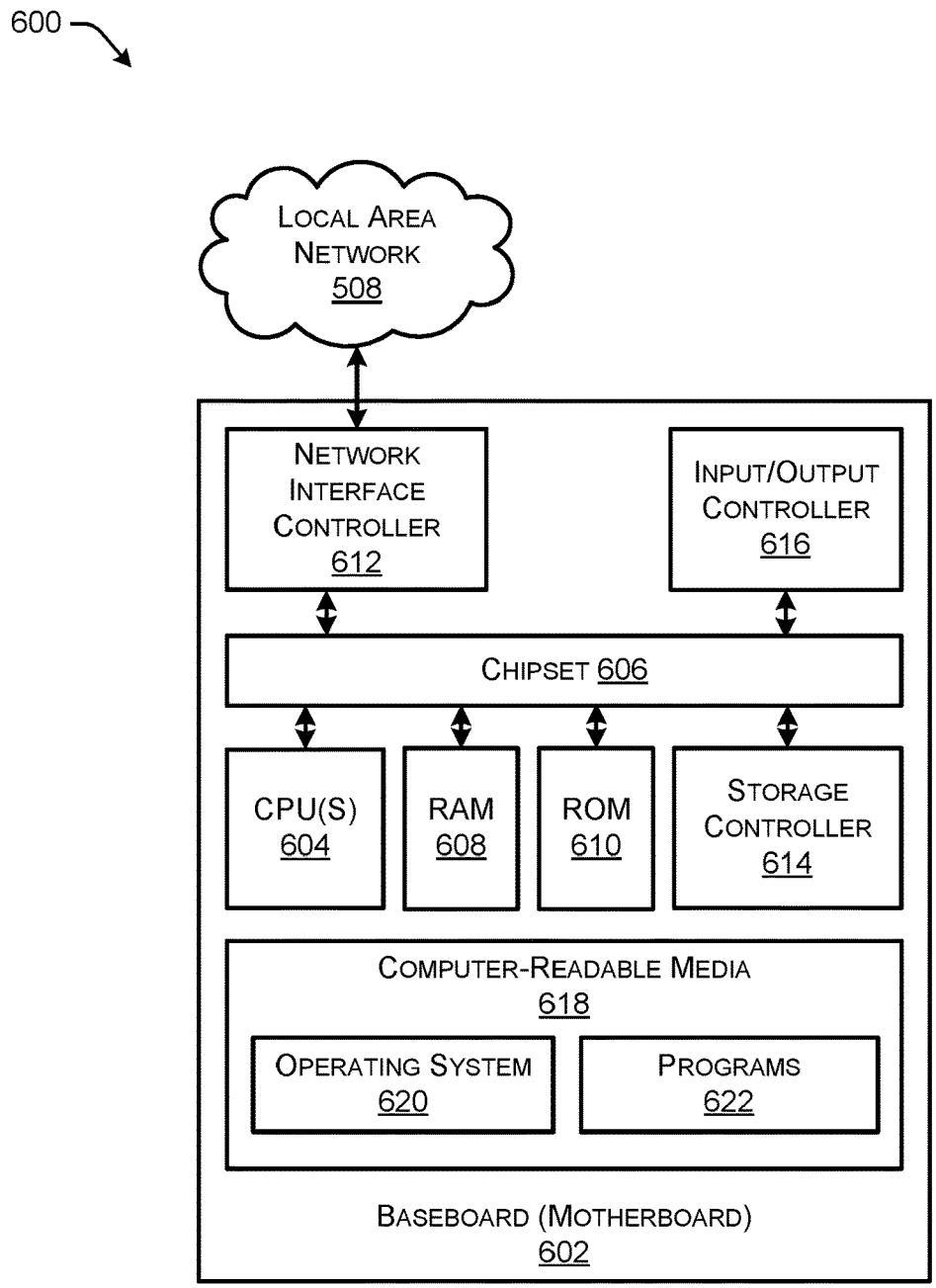
FIG. 6 illustrates a computer architecture diagram showing an example computer hardware architecture for implementing a computing device that may be utilized to implement aspects of the various technologies presented herein.

FIG. 6 shows an example computer hardware architecture 600. The computer hardware architecture 600 (which may be referred to as a computer or computer server 600) may correspond to a server computer 502 capable of executing program components for implementing the functionality described above. Additionally or alternatively, the computer architecture shown in FIG. 6 may correspond to a conventional server computer, workstation, desktop computer, laptop, tablet, network appliance, e-reader, smartphone, or other computing device, and can be utilized to execute any of the software components presented herein. In some examples, the computer server 600 shown in FIG. 6 may be used in various combinations and/or at various sites (e.g., on-premises networks) to implement one or more datacenters 104. For example, the computer server 600 may be used to implement various servers, spine components, leaf components, network devices, datastores, virtual machines, endpoint devices, etc.). Further, the computer server 600 shown in FIG. 6 may be used to execute any of the software components presented herein. Although not shown in this example, the computer server 600 also may comprise network devices such as servers, switches, routers, hubs, bridges, gateways, modems, repeaters, access points, etc.

Additionally or alternatively, the computer server 600 may be used to implement the topology display system 102 and/or user device(s) 118 as described in the examples herein, and may include any of the computing devices, systems, or components of the topology display system 102 and/or user device(s) 118 described herein. For example, the computer server 600 may be configured to perform, potentially in conjunction with other server computers, some or all of the operations of the topology display system 102.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 504 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 508. The chipset 606 can include functionality for providing network connectivity through a NIC 612, such as a gigabit Ethernet adapter. The NIC 612 is capable of connecting the computer 600 to other computing devices over the network 508. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

In some examples, the operations performed by the topology display system 102 and/or any components included therein, may be supported by one or more devices similar to computer 600. Stated otherwise, some or all of the operations performed by the topology display system 102 and or any components included therein, may be performed by one or more computer devices (e.g., computer 600) operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington.

According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above in reference to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture different than that shown in FIG. 6.

As described herein, the computer 600 may comprise any of the devices described herein. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the topology display system 102, datacenter 104, and/or user device(s) 118. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure performed by the topology display system 102, the datacenter 104, and/or user device(s) 118, etc. For instance, the programs 622 may cause the computer 600 to perform techniques for receiving and responding to requests to pin and unpin nodes displayed within the network topology user interface, and/or for determining object data relating to the corresponding nodes in the network topology as well as relationships between nodes, as described above in connection with the topology display system 102.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processor to perform operations comprising:
receiving data representing a network topology associated with a datacenter, wherein the datacenter comprises a plurality of objects operating at two or more sites in a computing environment;
displaying, via a user interface and on a display device, a network topology element including a graphical representation of the network topology, wherein the network topology element represents a first portion of the network topology;
receiving, via the user interface, a first input selecting a first node in the graphical representation, the first node representing a first object in the network topology;
determining, based on the first input, one or more properties of the first object;
displaying, within the network topology element, and based at least in part on a navigation input, a second portion of the network topology different from the first portion;
receiving, via the user interface, a second input selecting a second node in the graphical representation, the second node representing a second object in the second portion of the network topology;
determining, based on the second input, one or more properties of the second object;
determining, based on the second input, a first relationship between the first object and second object within the network topology; and
displaying, via the user interface, a pinned nodes element separate from the network topology element, the pinned nodes element including:
first data representing the one or more properties of the first object;
second data representing the one or more properties of the second object; and
an indication of a second relationship between the first object and the second object, wherein the second relationship is different from the first relationship.

2. The system of claim 1, wherein the indication within the pinned nodes element of the second relationship between the first object and the second object includes:
an indication that the first object and the second object correspond to a same object within the network topology.

3. The system of claim 1, the operations further comprising:
traversing the network topology to determine a first path from the first object to a root of the network topology;

traversing the network topology to determine a second path from the second object to the root of the network topology; and
displaying, within the pinned nodes element, data representing the first path associated with the first object and data representing the second path associated with the second object.

4. The system of claim 1, the operations further comprising:
receiving a request, via the user interface, to navigate to a different portion of the network topology; and
updating the network topology element, based on the request, to display the different portion of the network topology, wherein the different portion of the network topology does not include the first object or the second object, and wherein updating the user interface includes continuing to display the pinned nodes element.

5. The system of claim 1, wherein the pinned nodes element displays at least one of:
first object usage data associated with the first object and second object usage data associated with the second object;
first network traffic data associated with the first object and second network traffic data associated with the second object;
first operational status data associated with the first object and second operational status data associated with the second object; or
first connectivity data associated with the first object and second connectivity data associated with the second object.

6. The system of claim 5, the operations further comprising:
receiving updated network topology data from a system associated with the network topology; and
dynamically updating the pinned nodes element in response to receiving the updated network topology data.

7. The system of claim 1, the operations further comprising:
receiving a third input selecting a third node in the graphical representation, the third node representing a third object in the network topology; and
in response to third input, displaying within the pinned nodes element:
third data representing one or more properties of the third object;
an indication of a relationship between the third object and the first object within the network topology; and
an indication of a relationship between the third object and the second object within the network topology.

8. The system of claim 1, the operations further comprising:
receiving a third input selecting a third node in the graphical representation, the third node representing at least a third object in the network topology;
determining a number of objects in the network topology associated with the third node; and
based at least in part on determining that the number of objects associated with the third node meets or exceeds an object threshold, preventing data associated with the third object from being displayed within the pinned nodes element.

9. A method comprising:
displaying, via a user interface, a network topology element configured to display a graphical representation of a network topology on a display device;
receiving, via the user interface, a first input selecting a first node in the graphical representation, the first node representing a first object in the network topology;
receiving, via the user interface, a second input selecting a second node in the graphical representation, the second node representing a second object in the network topology, wherein the network topology, wherein the network topology element indicates a first relationship between the first object and the second object; and
displaying, via the user interface, based at least in part on the first input and the second input, a pinned nodes element separate from the network topology element in the user interface, the pinned nodes element including:
first data representing one or more properties of the first object;
second data representing one or more properties of the second object; and
an indication of a second relationship between the first object and the second object, wherein the second relationship is different from the first relationship.

10. The method of claim 9, wherein the indication within the pinned nodes element of the second relationship between the first object and the second object includes:
an indication that the first object and the second object correspond to a same object within the network topology.

11. The method of claim 9, further comprising:
traversing the network topology to determine a first path from the first object to a root of the network topology;
traversing the network topology to determine a second path from the second object to the root of the network topology; and
displaying, within the pinned nodes element, data representing the first path associated with the first object and data representing the second path associated with the second object.

12. The method of claim 9, further comprising:
receiving a request, via the user interface, to navigate to a different portion of the network topology; and
updating the network topology element, based on the request, to display the different portion of the network topology, wherein the different portion of the network topology does not include the first object or the second object, and wherein updating the user interface includes continuing to display the pinned nodes element.

13. The method of claim 9, wherein the pinned nodes element displays at least one of:
first object usage data associated with the first object and second object usage data associated with the second object;
first network traffic data associated with the first object and second network traffic data associated with the second object;
first operational status data associated with the first object and second operational status data associated with the second object; or
first connectivity data associated with the first object and second connectivity data associated with the second object.

14. The method of claim 13, further comprising:
receiving updated network topology data from a system associated with the network topology; and
dynamically updating the pinned nodes element in response to receiving the updated network topology data.

15. The method of claim 9, further comprising:
receiving a third input selecting a third node in the graphical representation, the third node representing a third object in the network topology; and
in response to third input, displaying within the pinned nodes element:
third data representing one or more properties of the third object;
an indication of a relationship between the third object and the first object within the network topology; and
an indication of a relationship between the third object and the second object within the network topology.

16. The method of claim 9, further comprising:
receiving a third input selecting a third node in the graphical representation, the third node representing at least a third object in the network topology;
determining a number of objects in the network topology associated with the third node; and
based at least in part on determining that the number of objects associated with the third node meets or exceeds an object threshold, preventing data associated with the third object from being displayed within the pinned nodes element.

17. One or more non-transitory computer-readable media storing computer-executable instructions that, when executed by one or more processors, cause the one or more processors to perform operations comprising:
displaying, via a user interface, a network topology element configured to display a graphical representation of a network topology on a display device;
receiving, via the user interface, a first input selecting a first node in the graphical representation, the first node representing a first object in the network topology;
receiving, via the user interface, a second input selecting a second node in the graphical representation, the second node representing a second object in the network topology, wherein the network topology element indicates a first relationship between the first object and the second object; and
displaying, via the user interface, based at least in part on the first input and the second input, a pinned nodes element separate from the network topology element in the user interface, the pinned nodes element including:
first data representing one or more properties of the first object;
second data representing one or more properties of the second object; and
an indication of a second relationship between the first object and the second object, wherein the second relationship is different from the first relationship.

18. The one or more non-transitory computer-readable media of claim 17, wherein the indication within the pinned nodes element of the second relationship between the first object and the second object includes:
an indication that the first object and the second object correspond to a same object within the network topology.

19. The one or more non-transitory computer-readable media of claim 17, the operations further comprising:
traversing the network topology to determine a first path from the first object to a root of the network topology;
traversing the network topology to determine a second path from the second object to the root of the network topology; and
displaying, within the pinned nodes element, data representing the first path associated with the first object and data representing the second path associated with the second object.

20. The one or more non-transitory computer-readable media of claim 17, the operations further comprising:
receiving a request, via the user interface, to navigate to a different portion of the network topology; and
updating the network topology element, based on the request, to display the different portion of the network topology, wherein the different portion of the network topology does not include the first object or the second object, and wherein updating the user interface includes continuing to display the pinned nodes element.

* * * * *